Nov. 7, 1961  A. D. SIMPSON  3,007,518
MEANS FOR PREVENTING LEAKAGE OF FLUID
Filed June 6, 1958  5 Sheets-Sheet 1
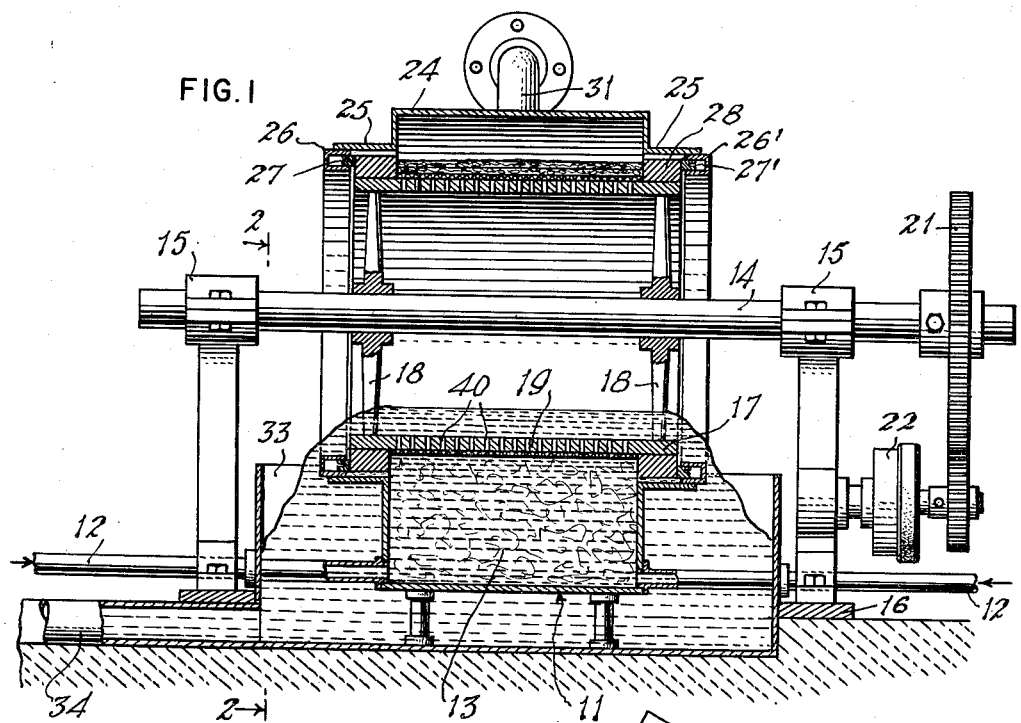
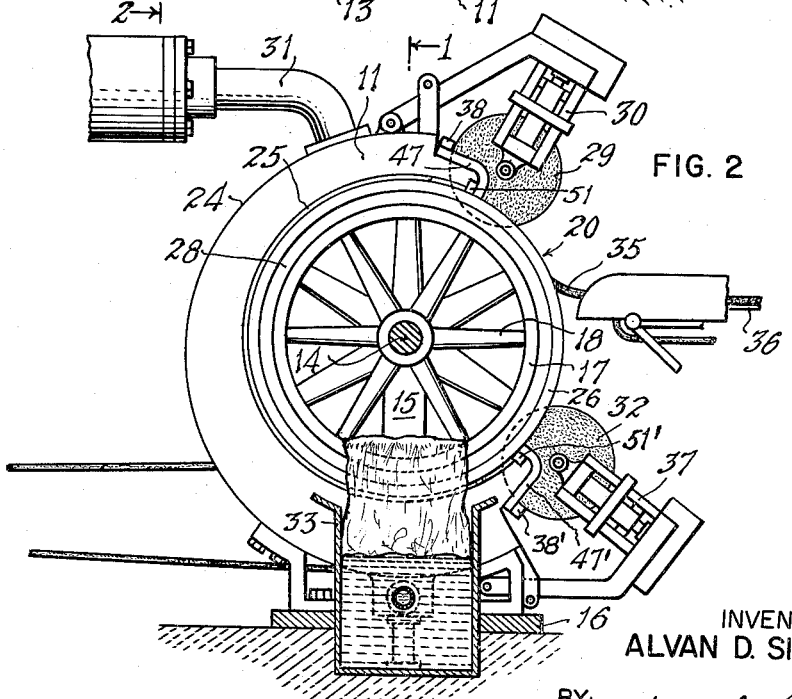
INVENTOR
ALVAN D. SIMPSON
BY: *Harry B. Cook,*
ATTORNEY

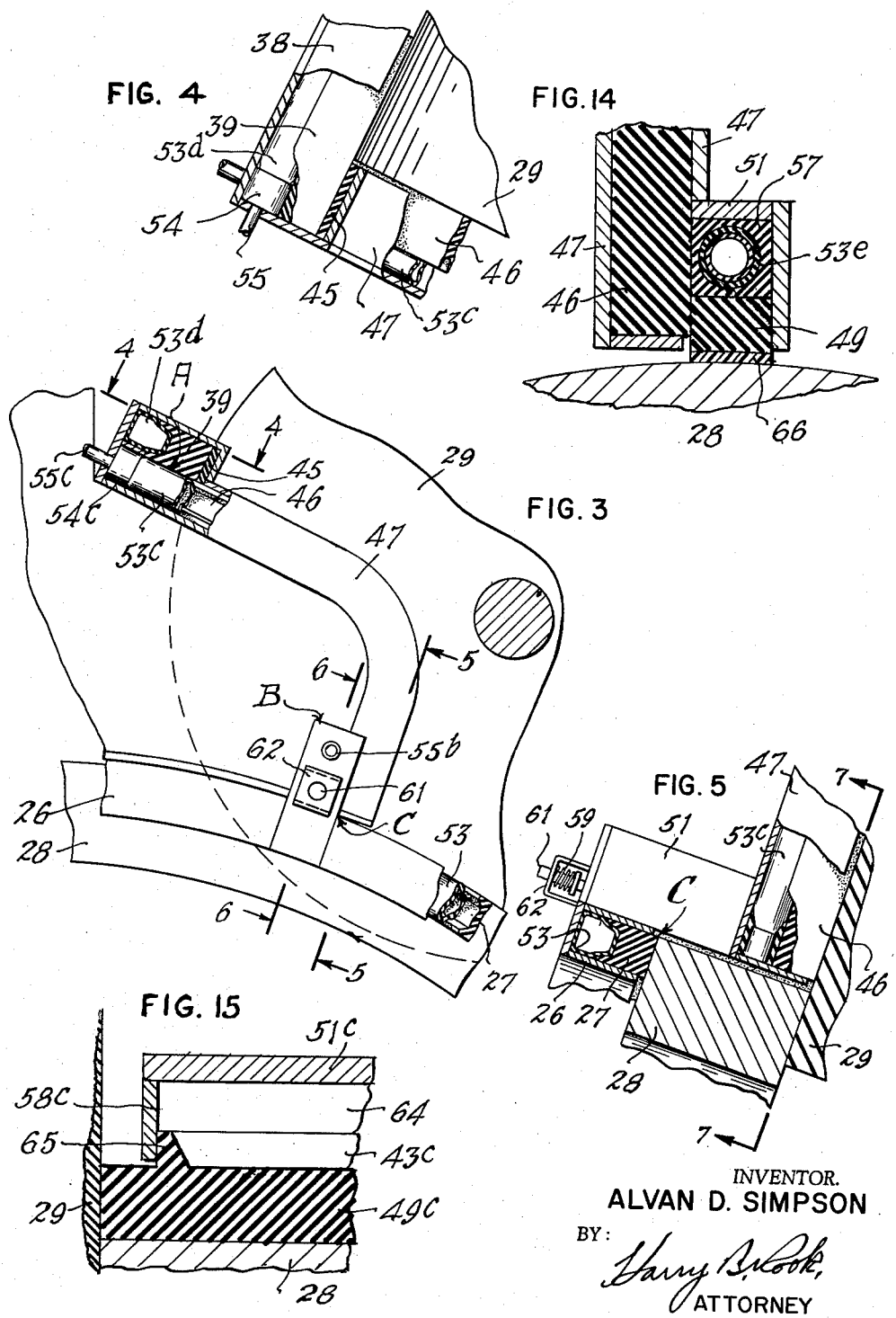

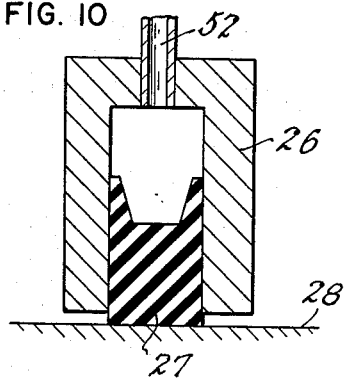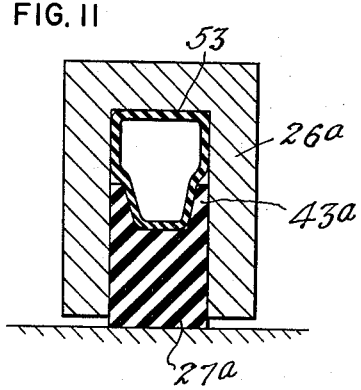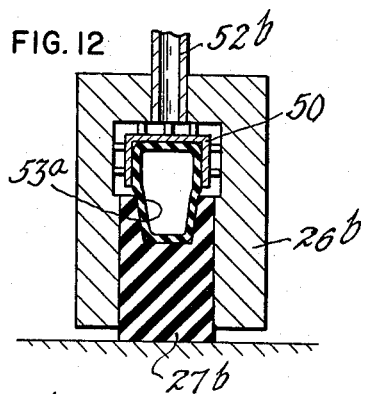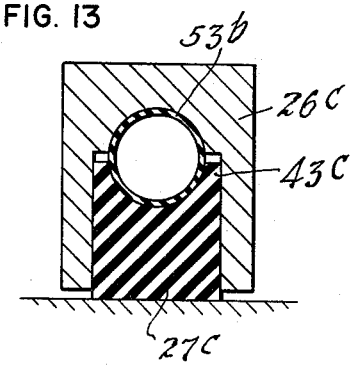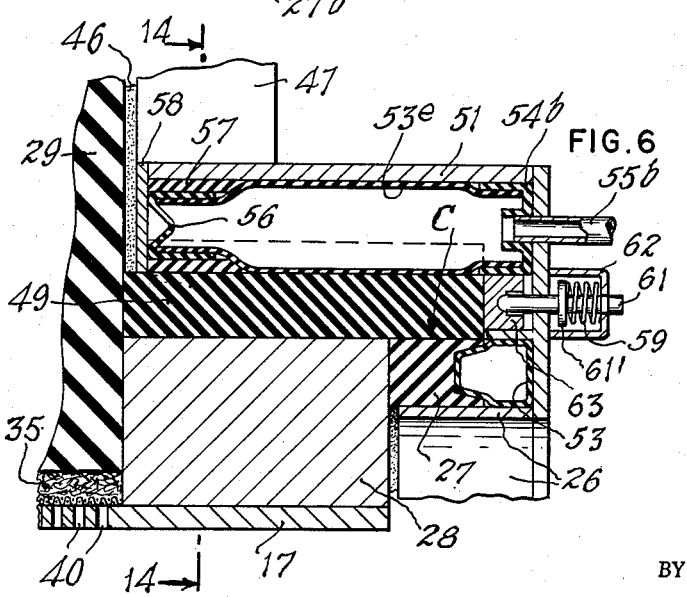
INVENTOR.
ALVAN D. SIMPSON
ATTORNEY Nov. 7, 1961  A. D. SIMPSON  3,007,518
MEANS FOR PREVENTING LEAKAGE OF FLUID
Filed June 6, 1958  5 Sheets-Sheet 4
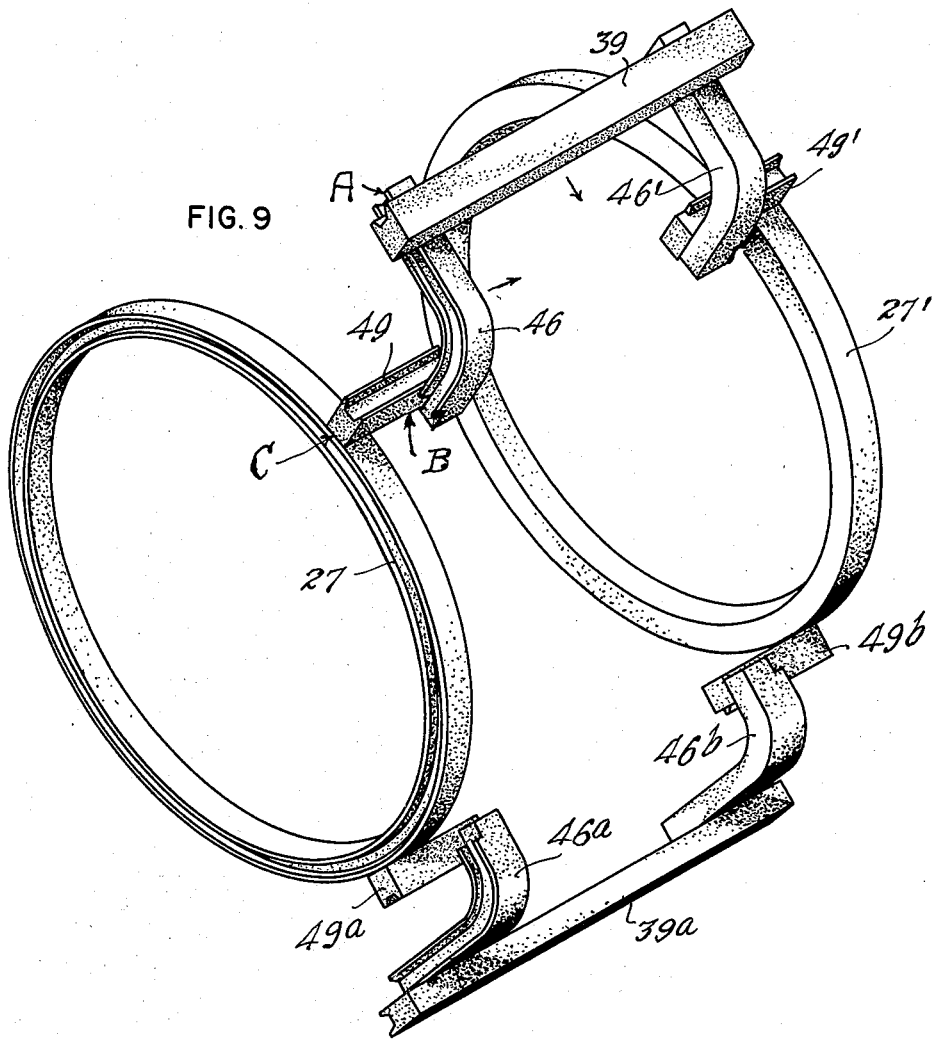
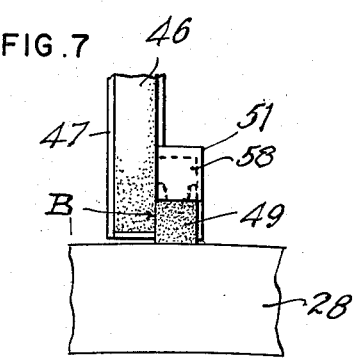
INVENTOR.
ALVAN D. SIMPSON
BY:
ATTORNEY

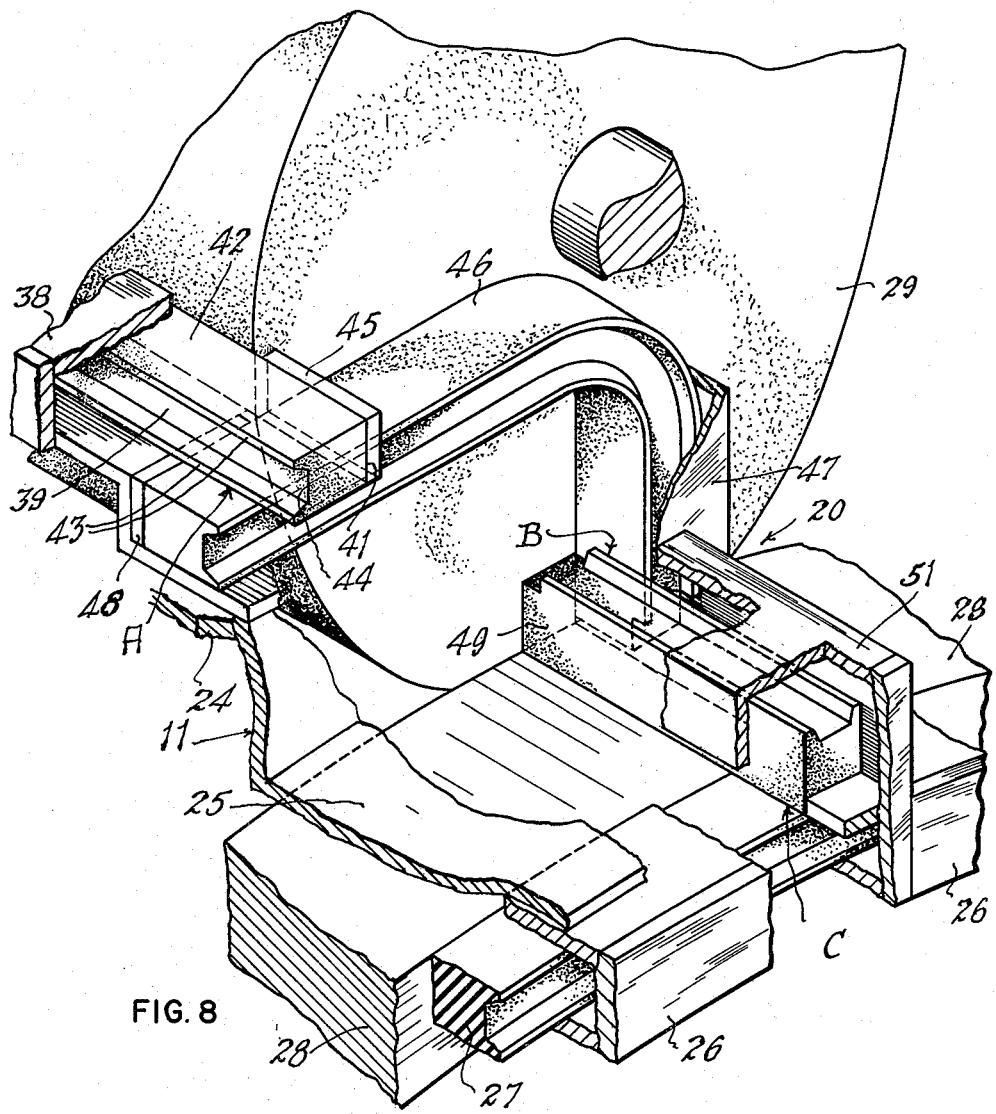

United States Patent Office 3,007,518
Patented Nov. 7, 1961

3,007,518
MEANS FOR PREVENTING LEAKAGE
OF FLUID
Alvan D. Simpson, Plainfield, N.J., assignor to The Forming Machine Company of America, Inc., Bound Brook, N.J., a corporation of Delaware
Filed June 6, 1958, Ser. No. 740,377
10 Claims. (Cl. 162—297)

This invention relates to means for preventing leakage, more especially, of fluid between fixed and movable parts, as from tanks through openings having movable parts mounted therein.

A specific application of my invention has to do with a machine for making continuous strips or webs of material by the deposit from a wet mix thereof onto a perforated peripheral wall of a tank or container, such as a hollow drum mounted for rotation as on a horizontal axis and partly disposed in or embraced by a tank containing such a wet mix. Such a mix may be an asbestos cement composition or a mixture of paper fibers, resin and water contained in the lower portion of the tank which has air under pressure in its upper portion, so that as the drum is rotated through the tank, the suspending liquid is forced through the perforations in said peripheral wall, leaving the solid matter deposited on the outer surface of said wall, after which the deposited layer is moved out of the mix to allow for draining of the liquid from the layer. The layer may be finally removed from the drum through an opening in one wall of the tank.

The present invention relates to an improvement over machines of the general nature described and claimed in my Patents Nos. 2,723,599 and 2,737,858. In the first of these patents, for example, the sealing means is molded to the desired shape having angular bends and curves to fit the structure to be sealed. In accordance with my present invention, I facilitate the manufacture of such sealing means, as well as improviding the leak-stopping characteristics, by making my sealing means in a plurality of sections with lap joints therebetween and having means for insuring an efficient seal at such joints.

While the present invention is especially concerned with an improvement in the sealing means for preventing leakage of fluid between the walls of such a tank and its drum, together with that between its drum and associated rollers, if such are employed, it is contemplated to use the invention in other machines where it may be desired to prevent leakage at the junctures of stationary and movable parts.

In its broader aspects, a prime object of the invention is to provide improved simple and inexpensive means for sealing the spaces between a member movable in an opening defined by edge portions of walls of a casing for holding fluid under pressure, and comprising metal holders angularly disposed to one another and secured to said edge portions, and resilient sealing strips mounted in said holders and pressed into fluid-tight engagement with said movable member, including at least one lap joint between said strips.

More especially, an important object of the invention is to provide sealing means between the stationary walls of a tank, the peripheral or circumferential surface of a drum rotatably mounted in the tank with a portion exposed through an opening in a wall of the tank, as well as between the tank walls and the end surfaces and peripheral or circumferential surfaces of a roller journalled in said tank or having a portion partly closing said opening.

Another object of my invention is to provide improved lap joint seals, wherein wings are provided on top of rubber sealing elements, using inflated tubes or compressed but otherwise free air for forcing such wings against the lap joints between such rubber elements and metal holders therefor.

A further object of my invention is to provide lap joints in rubber sealing members to thereby eliminate the necessity of any angular bends in any one sealing strip, whereby all sealing strips may be manufactured in straight form and when necessary bent to conform to curved portions to be sealed.

A still further object of my invention is to provide seals of the character above discussed wherein spacers are provided and cemented in place to compensate for wear in the rubber seal or roll.

An additional object of my invention is to use inflated tubes in connection with rubber sealing strips to press, not only on the top of the strips but on wings outstanding therefrom, to thereby make an extra tight juncture to avoid having the stock working by the seal.

A further object of my invention is to close off and seal the end of the metal seal holders, as by placing soft rubber plugs of the same size and shape as the openings to be sealed in the ends of such holders.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings wherein like reference characters denote like parts in the several views:

FIGURE 1 is a vertical longitudinal sectional view of the machine, taken approximately on the plane of the line 1—1 of FIGURE 2 in the direction of the arrows, parts being shown in elevation, of a positive pressure machine for making continuous strips of material from a wet mix, and embodying sealing means constructed in accordance with my invention.

FIGURE 2 is a side elevational view of a machine, as illustrated in FIGURE 1, with parts in vertical section showing the locations of the three lap joints and the general arrangement of the sealing means.

FIGURE 3 is an enlarged fragmentary elevational view, with parts in section, of an upper portion of the machine as shown in FIGURE 2, and illustrating the lap joints at one end of the upper or exit roll.

FIGURE 4 is a fragmentary sectional view on the plane of the line 4—4 of FIGURE 3, in the direction of the arrows, parts being shown in elevation.

FIGURE 5 is a fragmentary sectional view on the plane of the line 5—5 of FIGURE 3 in the direction of the arrows, parts being shown in elevation.

FIGURE 6 is an enlarged fragmentary sectional view on the plane of the line 6—6 of FIGURE 3 in the direction of the arrows, parts being shown in elevation.

FIGURE 7 is a fragmentary elevational view on the plane of the line 7—7 of FIGURE 5 in the direction of the arrows.

FIGURE 8 is an enlarged isometric view of a fragmentary upper portion of the machine as shown in FIGURE 2.

FIGURE 9 is an isometric view of the assembled rubber sealing members separated from other associated parts.

FIGURE 10 illustrates broadly in transverse section the employment of mere compressed air, rather than an inflatable tube, for holding a rubber sealing member in operative position.

FIGURE 11 is a transverse sectional view corresponding with FIGURE 10, but showing the employment of an inflatable tube instead of compressed air.

FIGURE 12 is a transverse sectional view corresponding with FIGURE 11, but showing the employment of both compressed air and an inflatable tube.

FIGURE 13 is a transverse sectional view also corresponding with FIGURE 11, but showing an alternate design for the inflatable tube.

FIGURE 14 is a transverse sectional view on the line 14—14 of FIGURE 6, in the direction of the arrows.

FIGURE 15 is a fragmentary sectional view corresponding generally with a portion of FIGURE 6, but showing the employment of compressed air instead of inflatable tubes and the use of a wing or flange extending crossways on the rubber sealing member for sealing along the inside face of a metal end plate.

I have shown a machine of the type disclosed in my Pat. No. 2,723,599, dated November 15, 1955, for the purpose of illustrating the principles of the present invention, although it will be understood that said principles may be used in other ways or in connection with other machines, for example, such as shown in my Patent No. 2,737,858, dated March 13, 1956. The present machine, with reference to FIGS. 1 and 2, includes a tank or casing 11 that has one or more inlets or pipes 12 for a wet mix 13 of a suitable composition of matter. An example of such a composition is a combination of asbestos and cement such as is normally used in the manufacture of building shingles, sidings and the like. Such a mix may be of any suitable consistency, generally comprising asbestos or other fibrous material and particles of cement suspended in water or other mix as previously mentioned. The mix may be supplied to the tank by a suitable pump forcing it through said pipes 12, or in any desired manner.

Rotatably mounted on a shaft 14 having a horizontal axis, suitably journalled in bearings 15 supported from the base 16 of the machine, is a hollow cylindrical rotor drum 17. In the present embodiment, the drum 17 comprises two sets of spokes 18 carrying a hollow foraminous or perforated cylindrical wall 19, or one provided with many small and closely-spaced openings or apertures 40.

This drum is driven by suitable means, such as gearing 21, from a suitable power source 22. It is partly surrounded or embraced by the tank 11.

The circumferential or peripheral walls 24 of said tank are discontinued at one side to leave a polygonal or generally rectangular opening 20, at the right side of the machine as viewed in FIGURE 2, and through which a portion of the drum 17 projects. Said walls 24 are of maximum diameter around the perforated portion of the drum, but are decreased in diameter therebeyond, as indicated at 25, said decreased portions carrying metal channels 26 and 26' in turn holding rubber or other resilient sealing means 27 and 27', respectively, which are pressed against the rims or end portions 28 of the drum, for preventing loss of fluid between said drum and the walls 25 of the casing.

The drum 17 is so located that the lower portion thereof will, under normal operating conditions, be submerged in the mix 13 in the lower portion of the tank. Under such conditions, when the drum is rotating through the mix, it will carry a portion thereof from the upper surface of the mix to the top of the drum and beyond, as viewed most clearly in FIGURE 1. The liquid from the mix will flow through the perforations in the drum so as to leave a deposit of some of the solid matter of the mix upon said drum. As the latter continues to rotate, this solid matter which is deposited on the perforated drum 17 is removed through the opening in the circumferential wall of the tank above the level of the mix, said opening being here additionally defined by an upper or exit roll or roller 29, shorter than the drum 17, and suitably journalled and pressed toward said drum by means designated 30. Air or other suitable gas under pressure substantially in excess of atmospheric, as from fifteen to one hundred lbs. per sq. in., is supplied to the tank above the level of the mix, as from a suitable pump through a pipe 31. This pressure continually exerted on the mix tends to accelerate the flow of liquid therefrom through the drum and, at the same time, forces the liquid from the deposited layer on said drum.

More specifically describing the operation of the machine, the mix is fed into the tank 11 until the level thereof rises to or above a lower or entrance roll or roller 32 desirably of the same size as the upper roller 29 and suitably journalled and pressed toward said drum by means designated 37, adjacent the edge of the tank defining the lower portion of the opening through which the drum projects. The mix is continually pumped to the tank, as through pipes 12, the overflow therefrom passing to a catch basin 33 from whence it is withdrawn, as by means of pipe 34, for recirculation and return after its original consistency has been restored.

As the mix contacts the drum, a film of solid matter is deposited on the perforated portion thereof. When the drum 11 has sufficiently rotated to bring the film under the roller 29 at the upper edge of the opening, the compressed air in the space in the tank 11 above said drum and the mix, supplied through the pipe 31, acts thereon. The film on the drum inhibits the escape of air through said drum. As the pressure builds up in said tank space, the film becomes thicker due to acceleration of flow of the liquid from the mix through the perforations of the drum.

In such manner the machine is brought to normal operation, with the air pressure, speed of rotation of the drum, and the mix consistency adjusted so as to get the required thickness of the deposited layer at the desired production rate. The strip 35 of material, when fed out of the machine by the drum 17 past the roller 29, is then of the desired thickness and consistency and may be transported from the machine for subsequent processing, as on a conveyor belt 36.

From the foregoing, it will be seen that there are lines along which leakage of fluid may normally occur, which leakage it is an important purpose of my invention to substantially eliminate. In accordance with my invention I also, propose to stop the leakage by sealing strips of rubber or other resilient material which may be manufactured in straight form and bent to the desired shape, where other than straight shape is desired. Where right or other angular engagement between the sealing strips is necessary, such engagement takes the form of a lap joint rather than a permanent connection. All these sealing strips are mounted in holders or channels secured to the tank or container and opening toward the part of the moving member at which the sealing is to be effected. Various means are provided for urging said sealing members into fluid-tight engagement with the moving member or members and the details of the construction will now be described.

FIGURES 3 and 8 show, respectively, an end elevation with parts in section and an isometric view of the essentials of my sealing system adjacent the upper or outlet roller 29. I will first describe the parts with reference to the simpler FIG. 8. We have, first, a metal holder or channel 38 secured to the tank 11 adjacent the upper edge of the opening 20, and opening outwardly or toward the roller 29. In this channel is mounted a resilient sealing strip 39, generally rectangular in section, with a generally flat outer face 41, flat side faces 42 slidably engaging the inner faces of the flanges of the channel member 38, and wings or rearwardly extending tapered flanges 43. The outer surfaces of said wings 43 form continuations of the side faces 42 and the inner faces thereof define a channel 44 along the inner side of the sealing member 39 for a purpose which will be subsequently explained. In the present embodiment, each end portion of the metal holder 38 has secured thereto, as by cement, a pad 45, disposed adjacent an end of the roller 29 to compensate for wear in the rubber seal or roller.

Both of the rollers 29 and 32 are here of such length that they snugly fit between the end portions or rims 28 of the drum 17, when in engagement with the perforated portion of said drum or, in the case of the roller 29, adjacent thereto with a strip of material 35 passing therebetween. The means for sealing the end portions of the roller 29 above the rim portions 28 of the drum 17 comprise strips 46 and 46', like the strip 39 except that they are bent to the shape shown in FIGURES 3, 8 and 9 and received in correspondingly shaped channel members 47 secured to the corresponding edge portions of the tank 11 and opening toward the corresponding ends of the roller 29. Suitable means, to be subsequently described, are provided for urging the sealing members 46 and 46' into engagement with their ends of the roller 29. The members 47 and 47' are each also provided with a pad 48, only that for the member 46 being illustrated, which may be like the pad 45 and have a similar function. The joints between the sealing member 39 on the one hand, and 46 and 46', on the other, are made tight by means subsequently to be described.

A similar sealing system is provided along the outer face or circumferential surface of each rim 28 of the drum 17. In the embodiment illustrated, it takes the form of sealing members 49 and 49' of rubber of other similar resilient material like the other sealing members and shaped in cross-section like said sealing members 39, 46 and 46'. The members 49 and 49' are mounted in holders or channel members 51, only one of which is shown, secured to the corresponding edge portions of the tank 11 and pressed to sealing engagement, by suitable means to be subsequently described, against the circumferential surfaces of the rims 28. Lap joints between these sealing members 49 and 49' and the sealing members 46 and 46', respectively, are also provided and the tightness thereof insured by means to be subsequently described.

In order to seal the outer end surface of each rim 28 with respect to the tank 11, we have the channels 26, previously referred to, containing the generally circular sealing members 27 and 27' corresponding in section with the sealing members 39, 46, 46', 49 and 49', but curved to form complete circles along the peripheral edges of the rims 28, and pressed into tight engagement therewith by means to be subsequently described. We have here lap joints where the sealing members 49 and 49' at their outer end portions overlie and engage the outer peripheral surfaces of the sealing members 27 and 27', respectively.

Although I have illustrated completely the sealing arrangement at only one end of the upper roller 29, it will be understood that the sealing at the other end of said roller and at both ends of the lower or exit roller 32 is similar, whereby a complete and assembled rubber strip sealing system may be as illustrated in FIGURE 9. This system comprises not only the rubber sealing strip 39 and holder member 38, but the corresponding rubber sealing strip 39a and holder member 38' for the lower or entrance roller 32. It also comprises not only the bent rubber sealing strip 46, but also the bent rubber sealing strip 46' and holder member at the other end of the roller 29, and the corresponding rubber sealing strips 46a and 46b and holder members 47' at the corresponding ends of the roller 32. The system also comprises, not only the rubber sealing strip 49, but the corresponding sealing strip 49a and holder member 51' at the other end of the roller 29, and the corresponding sealing strips 49a and 49b and holder members at opposite ends of the roller 32. The sealing system not only comprises the rubber sealing strip 27, but also the rubber sealing strip 27' which engages the rim 28 at the other end of the rotor drum 17.

The means which may be employed for pressing the various sealing strips into engagement with the respective moving members are broadly illustrated successively in FIGURES 10 and 13, inclusive.

FIGURE 10 shows how a sealing strip, such as that designated 27 as a typical example only, may be pressed into engagement with its moving surface such as the outer surface of a rim 28, as a typical example only, by air which is compressed and enclosed in a channel, such as 26. Said air is otherwise free to act on the inner surface of the sealing member to press said member against a surface to be sealed. Compressed air for the purpose may be supplied to the channel 26, as a means of a pipe or tube 52.

FIGURE 11 shows a system similar to FIGURE 10, except that the pressure on the rubber sealing member 27a is applied by means of a rubber tube 53 held inflated by compressed air therein and supplied in any suitable manner, one means for the purpose being subsequently disclosed. The tube 53 thus may tightly engage, not only the inner sides of the channel 26a, but also the inner surface of the rubber sealing member 27a and its wings or flanges 43a projecting therefrom. This tube 53 shoves the wings of the rubber seal 27a against the metal holder 26a and also shoves the rubber seal against the surface to be sealed. It thus acts like compressed but otherwise free air, employed as illustrated in FIGURE 10, except that it has the additional advantage that it concentrates pressure at the tops of the wings of the seal. It thus makes said seal extra tight to help prevent stock from working by the seal into the holder at this location.

FIGURE 12 shows an arrangement using both compressed air and an inflated tube 53a with a sealing member 27b in a holder 26b. Supplemental holding means 50 here serves to confine and space the tube 53a from the inner surface of the holder 26b, while providing passages for movement of free compressed air from the supply tube 52b to the sealing member 27b. This construction combines the advantages of both, as the inflated tube action is positive and always shoves the wings of the seal against the metal holder and also shoves the rubber seal against the surface to be sealed. The otherwise free air has the advantage that its pressure may be a little greater than the pressure inside the machine and, therefore, if there is a leak in the seal between the seal holder and the machine interior, the air of the holder will leak into the machine interior instead of the mix and/or air in the machine leaking into the metal holder or channel.

Without the compressed air in the holder, the pressure therein would be approximately atmospheric. If the forming machine were operating at a pressure of twenty to fifty pounds per square inch, the entire pressure differential would then be available to force stock or mix through any leak in the holder. With compressed air in the holder at the same pressure as the machine internal pressure, no pressure differential exists to force stock past the seal into the holder. It is better to have the holder air pressure a little higher than the internal air pressure in the machine, so that at any leak in a seal air leaks out of the seal instead of the stock leaking in or trying to leak in.

The compressed air in the holder also tends to balance the internal pressure of the machine on the soft rubber plug, later to be described, and therefore prevents any movement of the plug lengthwise in the metal seal holder. If only inflated rubber tubes were used, there would be no force available to press the end of the seal across the rotor metal sealing ring against the end of the roller. The free compressed air will exert this necessary force, although at times it is desirable to supplement this air force with a spring, as will be later described.

Compressed but otherwise free air has other advantages at certain places. For instance, it is advantageous when a seal runs lengthwise across the face or top of the exit roller 29, where it serves as a doctor blade or scraper to remove any stock or foreign matter that might stick to the surface of the roller after the sheet has been removed. If any surface matter tries to work between the rubber seal and its holder, as soon as it makes a leak, free air when under pressure tries to blow it out. Such air by leaking shows the exact location of any leak at the outside face of the seal.

FIGURE 13 discloses an alternate design for the inflated tube 53b. Here the tube is kept in circular cross-section by the rubber sealing strip 27c which also has wings 43c. In both of FIGURES 11 and 13, compressed air can still be placed in the volume of the metal holder, 26a or 26c, not occupied by the inflated tube. Such air will distribute itself along the length, moving to places where the inflated tube does not fit perfectly in the holder. However, in such structures the quantity of compressed free air is very limited and a leak of any size would drop the air pressure to almost atmospheric.

In my previous description of FIGURES 8 and 9, I have shown how the sealing members 39, 39a, 46, 46', 46a, 46b, 49, 49', 49a, 49b, 27 and 27' are arranged, without specifically disclosing how the lap joints are kept tight and how they are pushed into tight engagement with the movable elements at which it is desired to effect a fluid tight engagement. I will now describe the structures illustrated in FIGURES 3, 4, 5, 6, 7 and 14 which disclose, specifically, how the sealing element actuating means, such as the compressed air, inflatable tubes or both, generally disclosed in FIGURES 10 to 13, inclusive, are applied. Although I will here disclose as typical instances one specific manner in which these pressure means are used, yet it will be understood that the alternatives disclosed in FIGURES 10 to 13, inclusive, may generally be used interchangeably at the places under consideration.

As seen in FIGURES 3 and 4, the outwardly-opening metal channel 38 secured to the tank 11, not only holds the resilient sealing strip 39, but also an inflatable rubber tube 53d, like that designated 53 in FIGURE 11. This tube 53d, is supplied with a rubber cap 54 disposed over the end thereof, in a manner also illustrated in FIGURE 6, where a similar rubber cap 54b is disposed over the end of an inflatable rubber tube 53e. The latter tube 53e is for the purpose of pressing the resilient sealing strip 49 into engagement with the rim 28, as well as effecting a tight lap joint with respect to the sealing member 27. Holes in the rubber caps 54 and 54b receive tubes 55 and 55b, respectively, through which compressed air may be supplied for inflating said tubes. The inflatable tube 53c in the holder 47 is also supplied with a cap 54c and tube 55c for a similar purpose.

The other end of each of the inflatable rubber tubes, or that which does not receive a compressed air supplying tube, is also closed by a rubber cap, one 56 of which is illustrated in FIGURE 6 for the tube 53e. Surrounding each cap 56 is a soft rubber plug 57. As the adjacent part of the metal seal holder for the inflatable tube and its accessories must not touch the end turface of the roller 29, it must stop short of said roller. This makes it necessary to close off and seal this end of the seal holder 51. When the tube is inflated it expands the rubber plug 57 and causes it to seal the end opening of the metal seal holder 51. In order to support the end of the inflated tube 53e and also to hold the plug 57 in place, a steel or other metal plate 58 is used at the end of the metal sealing holder as indicated.

When using only inflated tubes, there is no force to shove the ends of the rubber seals against the faces of the rollers. In order to supply this force, compression springs 59, only one of which is illustrated, are employed, said springs acting against the flange 61' on a punger 61, reciprocable in a wall of a channel member, such as 51, and a housing 62 outstanding therefrom, and acting on a plug 63 in direct engagement with the outer end of a sealing member, such as 49. When compressed but otherwise free air is also used, as illustrated in FIGURE 12, such springs are desirable but then they exert very little force.

In order to simplify the drawings, only inflatable tubes are disclosed in FIGURES 3 to 6, inclusive, and 14. However, it will be understood that any one of the other alternative embodiments may be used, not only for pressing the sealing elements 39 and 49 in place, but also for pressing the sealing elements 39a, 49', 49a, 49b, 46, 46', 46a, 46b, 27 and 27', instead of the inflatable tubes 53d and 53e here disclosed for the purpose. The inflatable tubes or other pressing means also act to insure tight engagement at the lap joints between the engaged faces of the sealing strips, in a manner illustrated most clearly in FIGURES 5, 6 and 14, the wings on said strips also improving the seal.

Referring now to FIGURE 15, there is disclosed a modification of the form shown in FIGURE 6, in which compressed air otherwise free is used instead of the inflatable tube 53e. This compressed air is supplied in the space 64, defined by the holder or channel 51c for the sealing element 49c. The element 49c is provided with a wing or web 65 uniting the corresponding ends of the flanges 43c of said sealing member 49c and engaging the adjacent face of the metal end plate 58c to prevent loss of air toward the adjacent face of the roller 29. Except as here disclosed fragmentarily, the structure may be identical with that illustrated in FIGURE 6.

I have found that such materials as "Teflon," otherwise known as polytetrafluoroethylene, "Ell slip" and similar materials cemented to the wearing surfaces of the rubber seals greatly reduces friction at said surfaces. I therefore contemplate using such materials for the purpose, as indicated by the facing part 66 in FIGURE 14.

Although in the present embodiment I have disclosed a machine in which the roller drum or main roller is longer than the upper or outlet roller or roll and the lower or inlet roller or roll, and said outlet and inlet rollers may be made of rubber or similar resilient material and act as part of the sealing means for the tank or container, yet I contemplate using my novel sealing elements and the means for pressing them into operative engagement with moving surfaces in other relationships. Examples are where the rotor drum or main roller is of the same length as the upper and lower rollers and where said upper and/or lower roller are or is omitted, as well as for other machines in which it is desired to prevent the loss of liquid.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. The combination of a casing for holding a liquid and a gas under pressure, said casing being defined by side and end walls and provided with an opening in the side wall, a drum embraced by said casing with a portion of its periphery projecting from said opening and its ends projecting from the end walls of the casing and having circumferential sealing surfaces and coaxial end sealing surfaces, metal channels carried by said end walls of the casing and opening toward one another and each disposed adjacent one end of the drum, first resilient sealing strips in said channels and in fluid-tight contact with the respective end sealing surfaces, an upper roller shorter than the drum at the upper edge of said opening with a peripheral portion closing the space between said edge of the opening and the outwardly projecting portion of the drum, second separate sealing strips in overlapping relatively slidable contact with the first sealing strips and in sealing contact with said circumferential sealing surfaces of the drum, third separate sealing strips each in fluid-tight contact with one end of said roller and each having one end in relatively slidable overlapping contact with one of the second sealing strips, a fourth sealing strip in fluid-tight contact with the periphery of said roller and with its ends in relatively slidable overlapping contact with the third sealing strips, holders for said second, third and fourth sealing strips and in fluid-tight contact therewith, and means for pressing said sealing strips into fluid-tight contact with said end sealing surfaces and said circumferential sealing surfaces of the drum, said end surfaces of the roller, and said peripheral surface of the roller, respectively, to thereby not only seal the spaces between the casing and said drum but also permit the sealing strips to adjust themselves to the sealing surfaces of the drum, to the end and peripheral surfaces of the roller and to each other, and means for sealing the spaces between the lower edge of said opening and the drum.

2. In the combination as defined in claim 1, said pressing means for pressing the sealing means against the ends of the roller and said pressing means for pressing the sealing means against the circumferential portions of the drum comprising inflatable tubes disposed in the corresponding said metal channels. and the addition of a soft resilient plug between one end of each of said inflatable tubes and the end portions of the corresponding metal channel to close and seal the end of said metal channel.

3. The combination as defined in claim 1 wherein said sealing strips have portions rectangular in cross-section and side wings extending away from the movable member and said rollers along the side walls of said holders, and inflatable tubes disposed in said holders and between said wings to engage the wings and to force them against the side walls of the holders and also press the sealing strips against the surfaces to be sealed.

4. The combination as defined in claim 1, wherein spring devices are employed to press longitudinally on the outer ends of the second sealing strips to hold the other ends of the sealing strips in engagement with the corresponding end surfaces of said roller.

5. The combination as defined in claim 4, with the addition of an inflatable tube in said holder and in contact with each of the second sealing strips for holding said sealing strips in contact with said circumferential surfaces of the drum and said first sealing strips, and with the addition of a soft resilient plug between one end of each of said inflatable tubes and the end wall of the corresponding holder to close and seal the end of said holder.

6. The combination as defined in claim 1 wherein there is a layer of polytetrafluoroethylene adhesively secured to the surfaces of said sealing strips that abut the surfaces to be sealed.

7. A machine as defined in claim 6 wherein said sealing strips have portions rectangular in cross-section and side wings extending away from the movable member along the side walls of said channels, and the means for pressing said sealing strips includes inflatable tubes disposed in said channels and between said wings to engage the wings and to force them against the side walls of the channels and also press the sealing strips into fluid-tight contact with the movable member and simultaneously press the overlapping portions of the strips into fluid-tight contact with each other.

8. A machine that includes a casing for holding a fluid under pressure formed with walls and provided with an opening, a member movable in said opening, and sealing means between said member and said casing at said opening comprising metal channels angularly disposed to one another bounding said opening and secured to said walls of said casing and having a resilient sealing element mounted in said metal channels, characterized in that said sealing element includes a plurality of resilient sealing strips, portions of some of which where they are disposed at angles to one another are in overlapping relatively slidable contact, thereby providing lap joints that permit the sealing strips to adjust themselves relatively to each other and to said movable member, and there are means for pressing said sealing strips into fluid-tight contact with said movable member and said metal channels and simultaneously pressing said overlapping portions of said strips into fluid-tight contact with each other.

9. A machine that includes a casing for holding a fluid under pressure formed with walls and provided with an opening, a member movable in said opening and means sealing the spaces between said member and said casing walls at said opening comprising a roller mounted on said casing walls rollably engaging said movable member along each of two opposite sides of said opening, and metal channels angularly disposed to one another bounding said opening and secured to said walls of said casing having a resilient sealing element mounted in said metal channels, characterized in that said sealing element includes a plurality of resilient sealing strips, certain of said strips are in fluid-tight contact with said movable member, and others of said strips are in fluid-tight contact with the peripheral surfaces of said rollers and with the end surfaces of said rollers, respectively, portions of some of said strips where they are disposed at angles to one another are in overlapping relatively slidable contact, thereby providing lap joints that permit the sealing strips to adjust themselves relatively to each other and to said movable member and said rollers, and there are means for pressing said sealing strips into fluid-tight contact with said movable member, said rollers and said metal channels and simultaneously pressing said overlapping portions of said strips into fluid-tight contact with each other.

10. A machine as defined in claim 9 wherein said pressing means for pressing the sealing means against the ends of the rollers and for pressing the sealing means against the movable member comprise inflatable tubes disposed in the corresponding said metal channels, and with the addition of a soft resilient plug between one end of each of said inflatable tubes and the end portions of the corresponding metal channel to close and seal the end of said metal channel.

References Cited in the file of this patent

UNITED STATES PATENTS

| | | |
|---|---|---|
| 2,373,443 | Armington | Apr. 10, 1945 |
| 2,723,599 | Simpson | Nov. 15, 1955 |
| 2,731,889 | Simpson | Jan. 24, 1956 |
| 2,737,858 | Simpson | Mar. 13, 1956 |